US012696210B2

(12) United States Patent
Kurita et al.

(10) Patent No.: US 12,696,210 B2
(45) Date of Patent: Jul. 28, 2026

(54) RADIO COMMUNICATION NODE

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 481 days.

(21) Appl. No.: 18/042,817

(22) PCT Filed: Aug. 27, 2020

(86) PCT No.: PCT/JP2020/032305
§ 371 (c)(1),
(2) Date: Feb. 24, 2023

(87) PCT Pub. No.: WO2022/044185
PCT Pub. Date: Mar. 3, 2022

(65) Prior Publication Data
US 2023/0309040 A1 Sep. 28, 2023

(51) Int. Cl.
*H04W 56/00* (2009.01)

(52) U.S. Cl.
CPC ..... *H04W 56/0045* (2013.01); *H04W 56/005* (2013.01)

(58) Field of Classification Search
CPC ...... H04M 15/57; H04M 15/66; H04M 15/00; H04L 12/1407; H04L 47/2408; H04L 65/1016; H04L 65/1069; H04L 65/1073; H04L 65/1104; H04L 65/4061; H04L 65/80; H04L 12/14; H04W 28/0268; H04W 4/10; H04W 12/08; H04W 28/0231; H04W 28/0252; H04W 28/0284; H04W 28/06; H04W 28/0967; H04W 28/12; H04W 28/24; H04W 4/24; H04W 4/90; H04W 48/16; H04W 72/02; H04W 72/1268; H04W 72/1273; H04W 76/10; H04W 76/11; H04W 76/22; H04W 76/50; H04W 8/005; H04W 84/042; H04W 28/02; H04W 72/12; H04W 8/00; H04W 16/26; H04W 56/00; H04W 56/0045; H04W 56/005

(Continued)

(56) References Cited

U.S. PATENT DOCUMENTS

| | | | | |
|---|---|---|---|---|
| 11,271,699 B1 * | 3/2022 | Eyuboglu | ............. | H04L 1/1819 |
| 11,375,527 B1 * | 6/2022 | Eyuboglu | ......... | H04B 7/15528 |

(Continued)

FOREIGN PATENT DOCUMENTS

| | | | | |
|---|---|---|---|---|
| EP | 4195811 A1 * | 6/2023 | ........... | H04L 5/0007 |

OTHER PUBLICATIONS

Office Action issued in Japanese Patent Application No. 2022-544984, dated Sep. 10, 2024 (6 pages).

(Continued)

*Primary Examiner* — Nathan S Taylor
(74) *Attorney, Agent, or Firm* — Osha Bergman Watanabe & Burton LLP

(57) ABSTRACT

A radio communication node (100 B) configures a number of first symbols to be used for dynamically adjusting transmission timing when performing uplink transmission in a first radio link connected to the upper node, and notifies the upper node thereof.

4 Claims, 8 Drawing Sheets

(58) Field of Classification Search
USPC .......................................................... 370/350
See application file for complete search history.

(56) References Cited

U.S. PATENT DOCUMENTS

| | | | | |
|---|---|---|---|---|
| 11,838,151 | B1* | 12/2023 | Jones .................. | H04L 25/0224 |
| 2021/0212070 | A1* | 7/2021 | Luo .................... | H04W 72/1263 |
| 2021/0289559 | A1* | 9/2021 | Sakhnini ............. | H04L 27/2662 |
| 2021/0321397 | A1* | 10/2021 | Abedini ................ | H04W 16/14 |
| 2021/0367819 | A1* | 11/2021 | Abedini ................ | H04W 80/02 |
| 2021/0377936 | A1* | 12/2021 | Yuan ................. | H04W 72/0446 |
| 2022/0131729 | A1* | 4/2022 | You ........................ | H04L 27/2607 |
| 2022/0131733 | A1* | 4/2022 | You ........................ | H04W 88/04 |
| 2022/0141074 | A1* | 5/2022 | You ..................... | H04L 27/2666 |
| | | | | 375/262 |
| 2022/0174670 | A1* | 6/2022 | Liu ......................... | H04L 5/0044 |
| 2022/0182977 | A1* | 6/2022 | Miao ................. | H04W 72/0446 |
| 2022/0353026 | A1* | 11/2022 | Yeo ........................ | H04L 5/0007 |
| 2022/0353123 | A1* | 11/2022 | Kim .................... | H04L 27/2603 |
| 2022/0377720 | A1* | 11/2022 | Park .................... | H04W 52/383 |
| 2023/0035967 | A1* | 2/2023 | Manolakos ........... | G01S 5/0063 |
| 2023/0083061 | A1* | 3/2023 | Korhonen ......... | H04W 56/0015 |
| | | | | 455/517 |
| 2023/0085606 | A1* | 3/2023 | Shao ...................... | H04B 1/713 |
| 2023/0126621 | A1* | 4/2023 | You ...................... | H04L 5/0094 |
| 2023/0199597 | A1* | 6/2023 | Peng ................. | H04B 7/15528 |
| | | | | 370/331 |
| 2023/0247574 | A1* | 8/2023 | Ghanbarinejad ... | H04W 56/001 |
| | | | | 370/503 |
| 2023/0309032 | A1* | 9/2023 | Ghanbarinejad . | H04W 56/0045 |
| 2024/0284494 | A1* | 8/2024 | Kim ....................... | H04W 72/51 |

OTHER PUBLICATIONS

International Search Report issued in PCT/JP2020/032305 on Apr. 6, 2021 (1 page).

Written Opinion of the International Searching Authority issued in PCT/JP2020/032305 on Apr. 6, 2021 (3 pages).

Vivo; "On Guard Symbol MAC CE Design"; 3GPP TSG-RAN WG2 Meeting #110 electronic, R2-2004494; Online; Jun. 1-12, 2020 (8 pages).

LG Electronics; "Discussions on IAB resource multiplexing enhancements"; 3GPP TSG RAN WG1 #102-e, R1-2006382; e-Meeting, Aug. 17-28, 2020 (5 pages).

3GPP TR 38.874 V16.0.0; "3rd Generation Partnership Project; Technical Specification Group Radio Access Network; NR; Study on Integrated Access and Backhaul; (Release 16)"; Dec. 2018 (111 pages).

Office Action issued in Chinese Application No. 202080103479.5, mailed May 23, 2024 (13 pages).

Office Action issued in Chinese Patent Application No. 202080103479.5, issued Apr. 30, 2025 (12 pages).

3GPP TSG RAN WG1 Meeting #99; R1-1911856; Huawei, HiSilicon; "Resource multiplexing between backhaul and access in IAB"; Reno, USA, Nov. 18-22, 2019 (7 pages).

* cited by examiner

| SCS | | Timing mode | | S0 | S1 | S2 | S3 | Oct 1 |
| --- | --- | --- | --- | --- | --- | --- | --- | --- |
| S4 | S5 | S6 | S7 | NmbGS | | | Nmb GS | Oct 2 |
| NmbGS | | ... | | | | | | Oct 3 |

| R | R | R | R | SCS | | Timing mode | | Oct 1 |
| --- | --- | --- | --- | --- | --- | --- | --- | --- |
| NmbGS₁ | | | NmbGS₂ | | | NmbGS₃ | | Oct 2 |
| Nmb GS₃ | NmbGS₄ | | | NmbGS₅ | | | Nmb GS₆ | Oct 3 |
| NmbGS₆ | | NmbGS₇ | | | NmbGS₈ | | | Oct 4 |

For 1st timing mode

For 2nd timing mode

Guard symbols inserted

RADIO COMMUNICATION NODE

TECHNICAL FIELD

The present disclosure relates to radio communication node that configures radio access and radio backhaul.

BACKGROUND ART

The 3rd Generation Partnership Project (3GPP) has specified Long Term Evolution (LTE) to further accelerate LTE by specifying LTE-Advanced (hereinafter referred to as LTE including LTE-Advanced), 5G New Radio (NR), or a successor to LTE called Next Generation (NG).

For example, in an NR radio access network (RAN), Integrated Access and Backhaul (IAB) is being studied which integrates radio access to a terminal (User Equipment, UE) and a radio backhaul between radio communication nodes such as a radio base station (gNB) (see Non-Patent Literature 1).

In IAB, an IAB node has a Mobile Termination (MT) function for connecting to a parent node (which may be referred to as an IAB donor) and a Distributed Unit (DU) function for connecting to a child node or UE.

In 3 GPP Release 16, radio access and radio backhaul are assumed to be half-duplex and time division multiplexing (TDM). In addition, in Release 17 of 3 GPP, application of frequency division multiplexing (FDM), space division multiplexing (SDM) and full-duplex communication (Full-duplex) are being studied. That is, simultaneous operation of MT and DU is being studied in Release 17 of 3 GPP.

In Non-Patent Literature 1, seven cases are specified concerning the adjustment (alignment) of the transmission timing between the parent node and the IAB node. Specifically, Non-Patent Literature 1 specifies, for example, adjustment of transmission timing of downlink (DL) between an IAB node and an IAB donor (Case #1), adjustment of transmission timing of DL and uplink (UL) within an IAB node (Case #2), adjustment of reception timing of DL and uplink (UL) within an IAB node (Case #3), combination of adjustment of transmission timing between DL of Case #1 and UL of Case #2 (Case #6), and combination of adjustment of transmission timing of DL of Case #1 and UL of Case #3 (Case #7).

In Release 16 of 3 GPP, a proposal has been made to avoid a conflict caused by a deviation between the transmission timing and the reception timing of the MT of the IAB node and the transmission timing and the reception timing of the DU of the IAB node. Specifically, in Release 16 of the 3 GPP, a proposal has been made to introduce a guard symbol into a transition portion between the transmission timing and reception timing of the MT of the IAB node and the transmission timing and reception timing of the DU of the IAB node.

CITATION LIST

Non-Patent Literature

[Non-Patent Literature 1]
3GPP TR 38.874 V 16.0.0, 3rd Generation Partnership Project; Technical Specification Group Radio Access Network; NR; Study on Integrated Access and Backhaul; (Release 16), 3 GPP, December 2018

SUMMARY OF INVENTION

Here, as a method for realizing simultaneous operation of the MT and the DU in the IAB node, for example, a configuration for dynamically switching a plurality of cases out of the above seven cases has been studied.

In the above-described configuration, for example, it is considered necessary to notify the number of guard symbols configured in accordance with the above-described plurality of cases in order to avoid the above-described conflicts.

Accordingly, the following disclosure has been made in view of such a situation, and it is an object of the present invention to provide a radio communication node capable of surely performing timing adjustment necessary for realizing simultaneous operation of MT and DU.

One aspect of the present disclosure is radio communication node (radio communication node 100 B) including a control unit (control unit 190) that configures a number of first symbols to be used for dynamically adjusting transmission timing when performing uplink transmission in a first radio link connected to an upper node, and a transmission unit (radio transmission unit 161) that notifies the upper node of the number of the first symbols.

MODES FOR CARRYING OUT THE INVENTION

Figure 1:
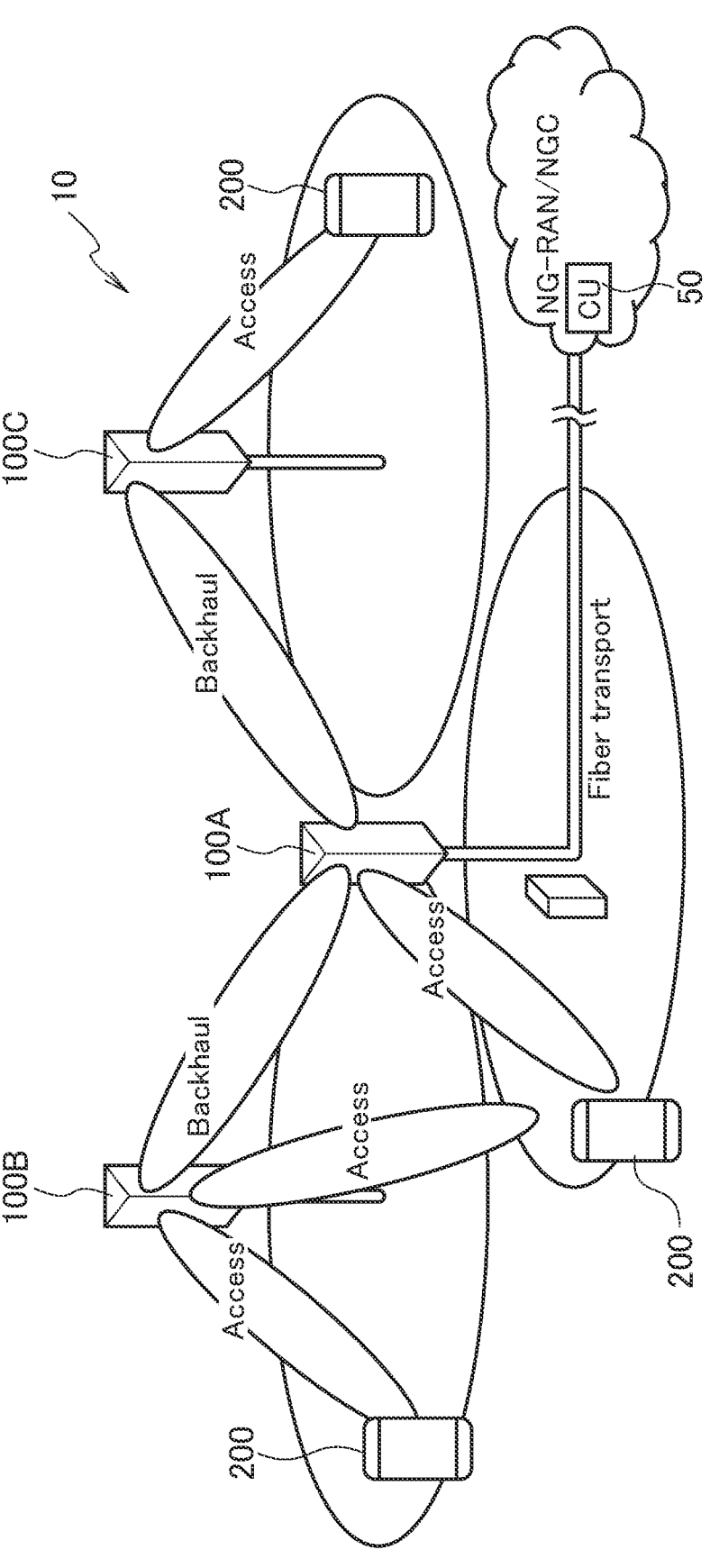
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of a radio communication system 10 according to this embodiment. The radio communication system 10 is a radio communication system in accordance with 5G New Radio (NR) and comprises a plurality of radio communication nodes and terminals.

Specifically, radio communication system 10 includes radio communication nodes 100 A, 100 B, 100 C, and a user terminal 200 (hereinafter referred to as UE 200).

The radio communication nodes 100 A, 100 B, 100 C can configure radio access with the UE 200 and radio backhaul (BH) between the radio communication nodes. Specifically, a backhaul (transmission path) by a radio link is configured between the radio communication node 100 A and the radio communication node 100 B, and between the radio communication node 100 A and the radio communication node 100 C.

Thus, a configuration in which radio access with the UE 200 and a radio backhaul between the radio communication nodes are integrated is called Integrated Access and Backhaul (IAB).

The IAB reuses existing functions and interfaces defined for radio access. In particular, Mobile-Termination (MT), gNB-DU (Distributed Unit), gNB-CU (Central Unit), User Plane Function (UPF), Access and Mobility Management Function (AMF), Session Management Function (SMF) and corresponding interfaces such as NR Uu (between MT and gNB/DU), F1, NG, X2 and N4 are used as baselines.

The radio communication node 100 A is connected to a NR radio access network (NG-RAN) and a core network (Next Generation Core (NGC) or 5 GC) via a wired transmission line such as a fiber transport. The NG-RAN/NGC includes a Central Unit 50 (CU 50) that is a communication node. NG-RAN and NGC may be included and simply referred to as "network".

The CU 50 may comprise any one or a combination of the above-described UPF, AMF and SMF. Alternatively, the CU 50 may be a gNB-CU as described above.

Figure 2:
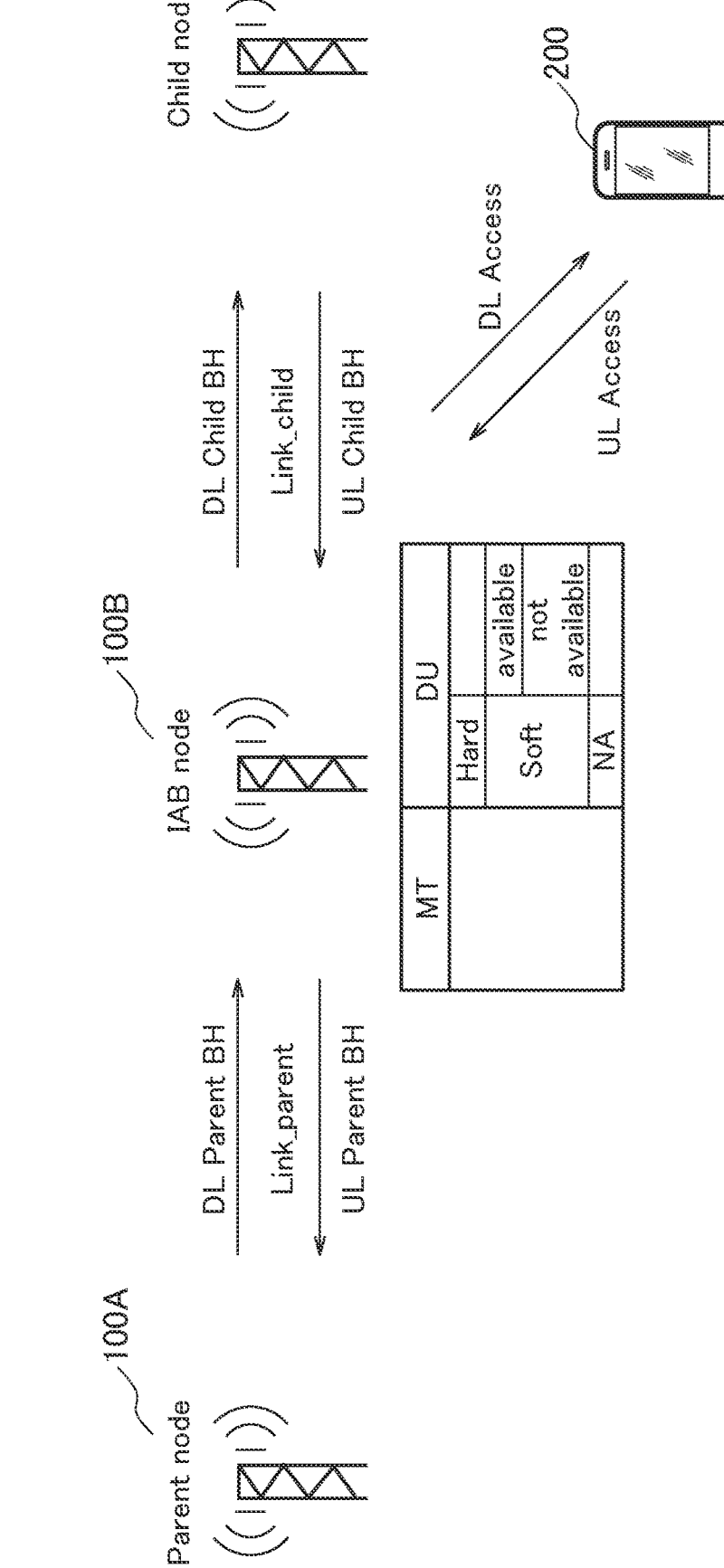
FIG. 2 is a diagram showing a basic configuration example of an IAB.

FIG. 2 is a diagram showing a basic configuration example of the IAB. As shown in FIG. 2, in this embodiment, the radio communication node 100 A constitutes a parent node in the IAB, and the radio communication node 100 B (and the radio communication node 100 C) constitutes an IAB node in the IAB.

The parent node may be referred to as an upper node in relation to the IAB node. In addition, the parent node may be referred to as an IAB donor. The IAB node may also be referred to as a subordinate node in relation to the parent node.

The child node in the IAB comprises other radio communication nodes not shown in FIG. 1. Alternatively, the UE 200 may constitute a child node. The IAB node may be referred to as an upper node in relation to the child node, and the child node may be referred to as a lower node in relation to the IAB node.

A radio link is configured between the parent node and the IAB node. Specifically, a radio link called Link-parent is configured.

A radio link is configured between the IAB node and the child node. Specifically, a radio link called Link-child is configured.

A radio link configured between such radio communication nodes is called a radio backhaul link. Link_parent is composed of DL Parent BH in the downward direction and UL Parent BH in the upward direction. The link_child is composed of a DL Child BH in the downward direction and a UL Child BH in the upward direction.

The radio link configured between the UE 200 and the IAB node or the parent node is called a radio access link.

Specifically, the radio link is composed of DL Access in the downward direction and UL Access in the upward direction.

The IAB node has a mobile termination (MT) which is a function for connecting with a parent node and a distributed unit (DU) which is a function for connecting with a child node (or UE 200). Although omitted in FIG. 2, the parent node and the child node also have MT and DU.

In terms of the radio resources used by the DU, the downlink (DL), uplink (UL) and flexible time-resources (D/U/F) are classified into any type of hard, soft or not available (H/S/NA). Also, available or not available is specified in the soft (S).

Although the configuration example of the IAB shown in FIG. 2 uses the CU/DU division, the configuration of the IAB is not necessarily limited to such a configuration. For example, the radio backhaul may comprise an IAB by tunneling using GPRS Tunneling Protocol (GTP)-U/User Datagram Protocol (UDP)/Internet Protocol (IP).

The main advantage of such an IAB is that NR cells can be flexibly and densely arranged without increasing the density of the transport network. IAB can be applied to a variety of scenarios, including outdoor small cell deployment, indoor, and even mobile relay (For example, in buses and trains) support.

The IAB may also support NR-only standalone (SA) deployments or non-standalone (NSA) deployments including other RATS (such as LTE), as shown in FIGS. 1 and 2.

In this embodiment, the radio access and radio backhaul operate on the premise of half-duplex communication. However, it is not necessarily limited to half-duplex communication, and full-duplex communication may be used if the requirements are satisfied.

Time division multiplexing (TDM), space division multiplexing (SDM) and frequency division multiplexing (FDM) are available as multiplexing methods.

When an IAB node operates in half-duplex communication, DL Parent BH is on the receiving (RX) side, UL Parent BH is on the transmitting (TX) side, DL Child BH is on the transmitting (TX) side, and UL Child BH is on the receiving (RX) side. In the case of the time division duplex (TDD), the setting pattern of DL/UL in the IAB node is not limited to DL-F-UL only, and only the radio backhaul (BH), a setting pattern such as UL-F-DL may be applied.

In this embodiment, SDM/FDM is used to realize simultaneous operation of DU and MT of the IAB node.

(2) Function Block Configuration of Radio Communication System

Next, the functional block configurations of the radio communication nodes 100 A and 100 B constituting radio communication system 10 will be described. In this disclosure, each of the seven cases (Case #1 to Case #7) specified in the 3 GPP TR 38.874 may be referred to as a timing mode or a timing adjustment method.

(2.1) Radio Communication Node 100 A

Figure 3:
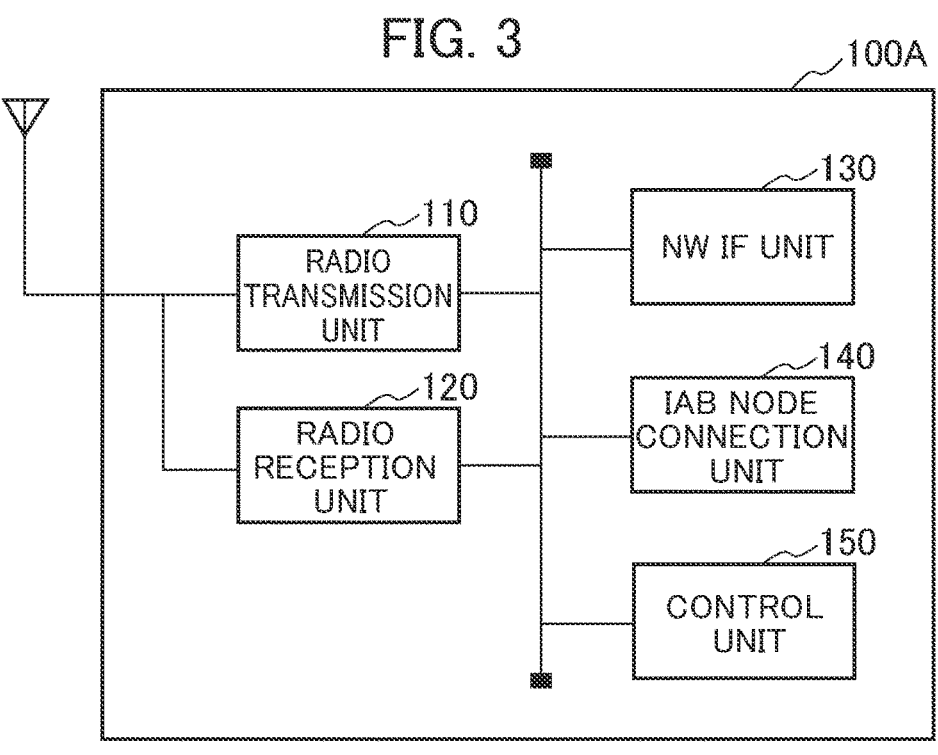
FIG. 3 is a functional block diagram of a radio communication node 100 A.

FIG. 3 is a functional block diagram of the radio communication node 100 A constituting the parent node. As shown in FIG. 3, the radio communication node 100 A includes a radio transmission unit 110, a radio reception unit 120, a NW IF unit 130, an IAB node connection unit 140, and a control unit 150.

The radio transmission unit 110 transmits radio signals in accordance with 5G specifications. The radio reception unit 120 also receives radio signals in accordance with the specifications of 5G. In this embodiment, the radio transmission unit 110 and the radio reception unit 120 execute radio communication with the radio communication node 100 B constituting the IAB node.

In this embodiment, the radio communication node 100 A has the functions of the MT and the DU, and the radio transmission unit 110 and the radio reception unit 120 also transmit and receive radio signals corresponding to the MT/DU.

The NW IF unit 130 provides a communication interface for achieving connection with the NGC side or the like. For example, the NW IF section 130 may include interfaces such as X2, Xn, N2, N3, etc.

The IAB node connection unit 140 provides an interface for achieving connection with an IAB node (or a child node including a UE). Specifically, the IAB node connection unit 140 provides the function of a distributed unit (DU). That is, the IAB node connection unit 140 is used for connection with an IAB node (or a child node).

The IAB node may be expressed as a RAN node supporting radio access to the UE 200 and backhauling the access traffic by radio. The parent node, or IAB donor, may also be represented as a RAN node that provides the interface of the UE to the core network and radio backhaul functionality to the IAB node.

The control unit 150 executes control of each function block constituting the radio communication node 100 A. Specifically, in the present embodiment, the control unit 150 controls the transmission timing of DL and UL and the reception timing of UL. Specifically, control unit 150 can adjust the transmission timing of DL and the transmission timing of UL at a subordinate node, for example, the radio communication node 100 B (IAB node). The control unit 150 can also adjust the reception timing of the UL at the radio communication node 100 B (IAB node).

The adjustment of the DL transmission timing of each radio communication node including the radio communication node 100 A may correspond to Case #1 defined in the 3 GPP TR 38.874.

The adjustment of the transmission timing of DL and UL in the IAB node may correspond to Case #2. Further, the adjustment of the reception timings of DL and UL in the IAB node may correspond to Case #3.

The adjustment in the IAB node may include adjustment of the transmission timing of DL in the IAB node, and the transmission timing of DL and UL may be adjusted in the IAB node.

That is, control unit 150 can support Case #6, which is a combination of adjustment of transmission timing between DL of Case #1 and UL of Case #2.

Further, the adjustment in the IAB node may include adjustment of the transmission timing of DL in the IAB node, and the reception timing of DL and UL may be adjusted in the IAB node.

That is, control unit 150 can support Case #7, which is a combination of adjustment of transmission timing of DL of Case #1 and adjustment of reception timing of UL of Case #3.

The control unit 150 can dynamically switch three timing modes, Case #1, Case #6 and Case #7, based on the number of guard symbols notified from the radio communication node 100 B.

(2.2) Radio Communication Node 100 B

Figure 4:
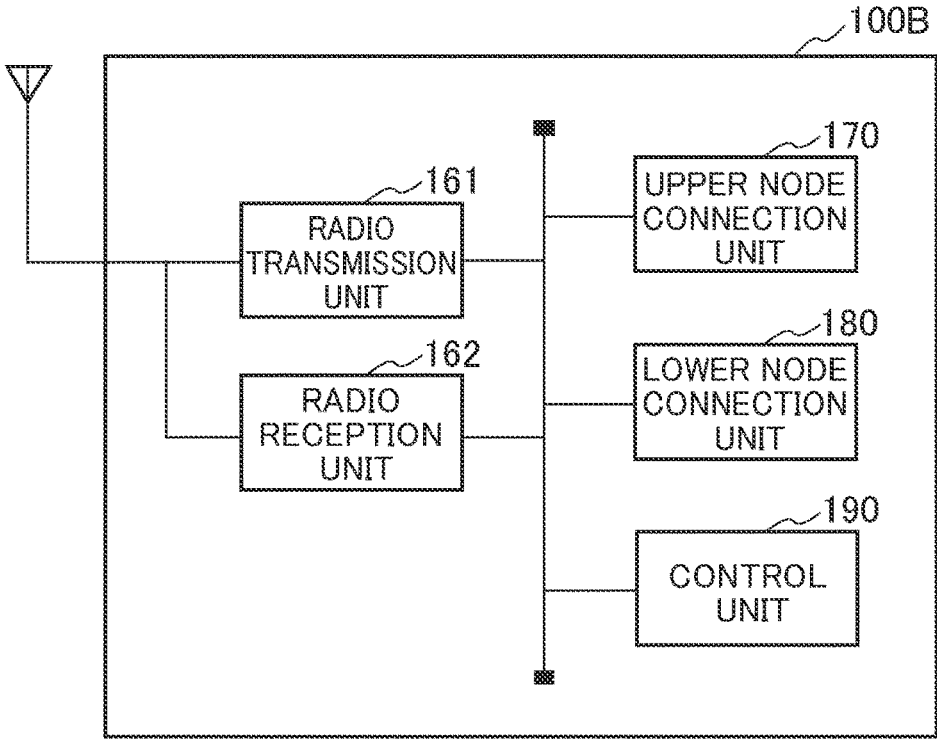
FIG. 4 is a functional block diagram of a radio communication node 100 B.

FIG. 4 is a functional block diagram of the radio communication node 100 B constituting the IAB node. As shown in FIG. 4, the radio communication node 100 B includes a radio transmission unit 161, a radio reception unit 162, an upper node connection unit 170, a lower node connection unit 180, and a control unit 190.

As described above, the radio communication node 100 B has a function block similar to that of the radio communication node 100 A (parent node) described above, but differs in that it includes the upper node connection unit 170 and the lower node connection unit 180, and in that the function of control unit 190.

The radio transmission unit 161 transmits radio signals in accordance with 5G specifications. The radio reception unit 162 also receives radio signals in accordance with the specifications of 5G. In this embodiment, the radio transmission unit 161 and the radio reception unit 162 execute radio communication with the radio communication node 100 A constituting the parent node and with the child node (including the case of the UE 200).

The radio transmission unit 161 can notify the upper node (parent node) of the number of guard symbols (the first symbol number) configured by control unit 190 for simultaneous operation of the upper node connection unit 170 and the lower node connection unit 180.

The radio transmission unit 161 can notify the lower node (child node) of the number of guard symbols (the number of second symbols) configured by the control unit 190 for simultaneous operation of the upper node connection unit 170 and the lower node connection unit 180.

In the notification of the number of guard symbols, MAC-CE (MAC-Control Element) of Release 16 may be used, or Enhanced MAC-CE (a specific example will be described later) which is an extension of MAC-CE may be used.

Figure 5:
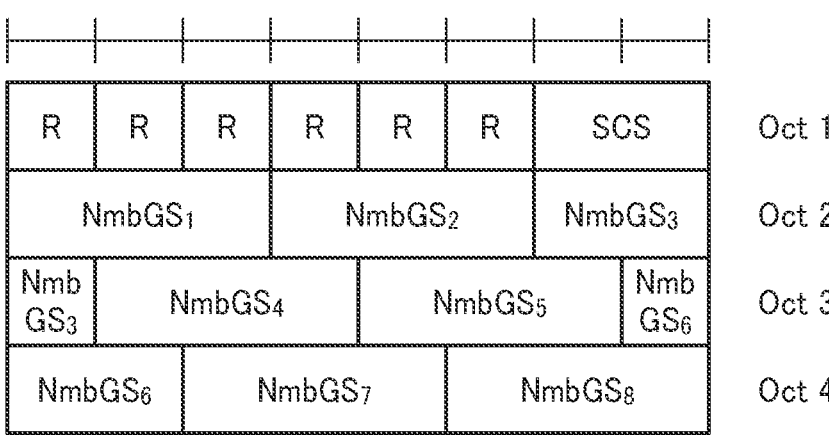
FIG. 5 is a diagram showing the configuration of the MAC-CE as specified in Release 16 of the 3 GPP.

The MAC-CE of Release 16 has, for example, a configuration shown in FIG. 5. In FIG. 5, "R" represents reserved bits, "SCS" represents subcarrier spacings, and $NmbGS_i$ ($i=1\sim8$) represents the number of guard symbols corresponding to each of the 8 switching scenarios defined in 3 GPP TR 38.821 V 16.0.0. Note that the number of guard symbols may be configured within a range from 0 to 4, for example.

The guard symbol is provided to avoid a conflict caused by a deviation between the transmission timing and the reception timing of the MT of the IAB node and the transmission timing and the reception timing of the DU of the IAB node. Therefore, the number of guard symbols may be configured according to, for example, the propagation delay of the radio backhaul link and the radio access link, the capability of the IAB node, the timing mode, and the like. Also, the IAB node needs to avoid the conflict described above.

The eight switching scenarios include four scenarios showing the switching from MT operation to DU operation and four scenarios showing the switching from DU operation to MT operation between the respective radio communication nodes (Upper Node, IAB Node, and lower Node) constituting the IAB.

Switching from MT operation to DU operation includes switching DL from RX to DL TX, DL from RX to UL RX, UL from TX to DL TX, and UL from TX to UL RX.

In the four scenarios showing switching from MT operation to DU operation, the number of guard symbols shown in $NmbGS_1$ is configured when switching from RX of DL to TX of DL, the number of guard symbols shown in $NmbGS_2$ is configured when switching from RX of DL to RX of UL, the number of guard symbols shown in $NmbGS_3$ is configured when switching from TX of UL to TX of DL, and the number of guard symbols shown in NmbGS$_4$ is configured when switching from TX of UL to RX of UL.

Switching from DU operation to MT operation includes switching from TX in DL to RX in DL, from RX in UL to RX in DL, from TX in DL to TX in UL, and from RX in UL to TX in UL.

In the four scenarios showing switching from DU operation to MT operation, the number of guard symbols shown in NmbGS$_5$ is configured when switching from TX of DL to RX of DL, the number of guard symbols shown in NmbGS$_6$ is configured when switching from RX of UL to RX of DL, the number of guard symbols shown in NmbGS$_7$ is configured when switching from TX of DL to TX of UL, and the number of guard symbols shown in NmbGS$_8$ is configured when switching from RX of UL to TX of UL.

The radio reception unit 162 receives downlink control information (DCI) from an upper node. Specifically, the radio reception unit 162 can receive a DCI indicating which of the timing modes Case #1, Case #6, and Case #7 has performed the timing adjustment in the upper node.

The radio reception unit 162 receives uplink control information (UCI) from a lower node. Specifically, the radio reception unit 162 can receive the UCI indicating which of the timing modes Case #1, Case #6, and Case #7 has performed the timing adjustment in the lower node.

The upper node connection unit 170 provides an interface for achieving connection with a node higher than the IAB node. The upper node means a radio communication node located on a network, more specifically, on the core network side (which may be referred to as an upstream side or an upstream side) than the IAB node.

More specifically, the upper node connection unit 170 provides the function of Mobile Termination (MT). That is, in the present embodiment, the upper node connection unit 170 is used for connection with a parent node constituting the upper node.

The lower node connection unit 180 provides an interface for realizing connection with a node lower than the IAB node. The lower node means a radio communication node located on the end user side (which may be referred to as the downstream side or the downstream side) than the IAB node.

Specifically, the lower node connection unit 180 provides the function of a distributed unit (DU). That is, in the present embodiment, the low-order node connection unit 180 is used for connection with a child node (which may be UE 200) that constitutes a low-order node.

The control unit 190 executes control of each function block constituting the radio communication node 100 B. In particular, in the present embodiment, the control unit 190 controls the transmission timing of DL and UL and the reception timing of UL. Specifically, the control unit 190 can adjust the transmission timing of the DL and the transmission timing of the UL in a subordinate node, for example, a child node including the UE. The control unit 190 can adjust the reception timing of the UL in the child node.

The adjustment of the DL transmission timing of each radio communication node including the radio communication node 100 B may correspond to Case #1 defined in the 3 GPP TR 38.874.

Further, the adjustment of the transmission timing of DL and UL in the lower node may correspond to Case #2. Further, the adjustment of the reception timings of DL and UL in the lower node may correspond to Case #3.

The adjustment in the lower node may include adjustment of the transmission timing of DL in the lower node, and the transmission timing of DL and UL may be adjusted in the lower node.

That is, the control unit 190 can support Case #6, which is a combination of adjustment of transmission timing between DL of Case #1 and UL of Case #2.

Further, the adjustment in the lower node may include adjustment of the transmission timing of DL in the lower node, and the reception timing of DL and UL may be adjusted in the lower node.

That is, the control unit 190 can support Case #7, which is a combination of adjustment of transmission timing of DL of Case #1 and adjustment of reception timing of UL of Case #3.

The control unit 190 can perform the operation related to the timing mode of Case #7a for adjusting the transmission timing of the TX of UL in accordance with the timing adjustment when the timing adjustment is performed by Case #7 in the upper node based on the information contained in the DCI received by the radio reception unit 162.

When timing adjustment is performed by Case #6 at a subordinate node based on the information contained in the UCI received by the radio reception unit 162, the control unit 190 can perform an operation related to the timing mode of Case #6 a for adjusting the reception timing of the RX of UL in accordance with the timing adjustment.

Based on the information contained in the DCI received by the radio reception unit 162, the control unit 190 can adjust the transmission timing of the TX of the UL while dynamically switching the three timing modes of Case #1, Case #6 and Case #7a.

The control unit 190 can adjust the reception timing of the RX of the UL while dynamically switching the three timing modes of Case #1, Case #6 a and Case #7 based on the information contained in the UCI received by the radio reception unit 162.

The control unit 190 can configure the number of guard symbols every time the timing mode is switched.

That is, the IAB node (radio communication node 100 B) can configure the number of guard symbols (first symbol number) used for dynamically adjusting the transmission timing in the uplink transmission (TX of UL) in the first radio link (Link_parent) connected to the upper node (radio communication node 100 A), and can notify the upper node of the number of guard symbols. The IAB node (radio communication node 100 B) can configure the number of guard symbols (the number of second symbols) used for dynamically adjusting the reception timing in the uplink reception (RX of UL) in the second radio link (Link_child) connected to the lower node (child node), and can notify the lower node of the number of guard symbols.

In this embodiment, three timing modes, Case #1, Case #6 and Case #7, are supported even in a node (child node) lower than the radio communication node 100 B (IAB node), and the three timing modes can be dynamically switched.

(3) Operation of Radio Communication System

Next, the operation of the radio communication system 10 will be described. Specifically, an operation related to adjustment of the transmission timing and the reception timing of DL and UL in the case of realizing simultaneous operation (simultaneous Tx/Rx) of DU and MT of the IAB node will be described.

More specifically, when the parent node and the child node constituting the IAB support the three timing modes of Case #1, Case #6, and Case #7 specified in the 3GPP TR 38.874, an operation related to the adjustment of the transmission timing and the reception timing of DL and UL for enabling the DU and MT of the IAB node to operate simultaneously will be described.

In this embodiment, since it is necessary to guarantee the adjustment of the transmission timing of DL between the radio communication nodes constituting the IAB, it is assumed that the reception timing of RX of UL and the transmission timing of TX of DL do not change even in different timing modes.

(3.1) Operation Outline

The radio communication node 100 B (IAB node) selects one of the three timing modes Case #1, Case #6, and Case #7a based on the information contained in the DCI transmitted from the radio communication node 100 A, and adjusts the transmission timing and the reception timing according to the selected timing mode.

The radio communication node 100 B (IAB node) configures the number of guard symbols corresponding to one timing mode selected on the basis of information contained in the DCI, and notifies the radio communication node 100 A (parent node) of the configured number of guard symbols by MAC-CE.

The radio communication node 100 B (IAB node) selects one of the three timing modes Case #1, Case #6 a and Case #7 based on the information contained in the UCI transmitted from the lower node, and adjusts the transmission timing and the reception timing according to the selected timing mode.

The radio communication node 100 B configures the number of guard symbols according to one timing mode selected on the basis of the information contained in the UCI, and notifies the lower node of the configured number of guard symbols by the MAC-CE.

(3.2) Example of Operation

Next, operations related to the configuration and notification of the number of guard symbols by the IAB node will be described.

(3.2.2) Operation Example 1

In this operation example, the number of guard symbols at the time of switching between MT and DU may be configured on the assumption that different timing modes (For example, Case #1, Case #6 and Case #7) are configured in Link_parent.

(3.2.2.1) Example 1-1

In this operation example, the number of guard symbols may be notified to the radio communication node 100 A while using the MAC-CE of Release 16. In this operation example, the same number of guard symbols may be used in a plurality of timing modes. In this operation example, the number of guard symbols corresponding to any of the following may be notified by the MAC-CE.

- (Alt.1) Number of guard symbols depending on the implementation status of the three timing modes Case #1, Case #6, and Case #7a.
- (Alt.2) The minimum number of guard symbols among the three timing modes Case #1, Case #6 and Case #7a.

- (Alt.3) The maximum number of guard symbols configured in the three timing modes Case #1, Case #6, and Case #7a.

(3.2.2.2) Example 1-2

In this operation example, the number of guard symbols may be notified to the radio communication node 100 A while using the MAC-CE of Release 16. In the present operation example, the guard symbol numbers may be different from each other in a plurality of timing modes. In this operation example, the radio communication node 100 A can calculate the number of guard symbols in each timing mode using the notification of the MAC-CE. In the calculation of the number of guard symbols in this operation example, the value of TA (Timing Advance) in each timing mode can be used, for example.

(3.2.2.2.1) Example 1-2-1

The number of guard symbols of the TX of the UL in Case #1 may be configured to a number corresponding to the transmission timing of the TX of the UL in Case #1, and may be notified to the radio communication node 100 A by the MAC-CE.

The number of guard symbols in Case #6 may be configured (calculated) based on the number of guard symbols configured according to the transmission timing of the TX of UL in Case #1 and the difference between the TA (Timing Advance) of the TX of UL in Case #6 and the TA (Timing Advance) of the TX of UL in Case #1, and may be notified to the radio communication node 100 A by the MAC-CE.

The number of guard symbols in Case #7a may be configured (calculated) based on the number of guard symbols configured according to the transmission timing of the TX of UL in Case #1 and the difference between the TA (Timing Advance) of the TX of UL in Case #7a and the TA (Timing Advance) of the TX of UL in Case #1, and may be notified to the radio communication node 100 A by the MAC-CE.

(3.2.2.2.2) Example 1-2-2

The number of guard symbols of the TX of the UL in Case #6 may be configured to a number corresponding to the transmission timing of the TX of the UL in Case #6, and may be notified to the radio communication node 100 A by the MAC-CE.

The number of guard symbols in Case #1 may be configured (calculated) based on the number of guard symbols configured according to the transmission timing of the TX of UL in Case #6 and the difference between the TA (Timing Advance) of the TX of UL in Case #1 and the TA (Timing Advance) of the TX of UL in Case #6, and may be notified to the radio communication node 100 A by the MAC-CE.

The number of guard symbols in Case #7a may be configured (calculated) based on the number of guard symbols configured according to the transmission timing of the TX of UL in Case #6 and the difference between the TA (Timing Advance) of the TX of UL in Case #7a and the TA (Timing Advance) of the TX of UL in Case #6, and may be notified to the radio communication node 100 A by the MAC-CE.

(3.2.2.2.3) Example 1-2-3

The number of guard symbols of the TX of UL in Case #7a may be configured to a number corresponding to the transmission timing of the TX of UL in Case #7a, and may be notified to the radio communication node 100 A by the MAC-CE.

The number of guard symbols in Case #1 may be configured (calculated) based on the number of guard symbols configured according to the transmission timing of the TX of UL in Case #7a and the difference between the TA (Timing Advance) of the TX of UL in Case #1 and the TA (Timing Advance) of the TX of UL in Case #7a, and may be notified to the radio communication node 100 A by the MAC-CE.

The number of guard symbols in Case #6 may be configured (calculated) based on the number of guard symbols set according to the transmission timing of the TX of UL in Case #7a and the difference between the TA (Timing Advance) of the TX of UL in Case #6 and the TA (Timing Advance) of the TX of UL in Case #7a, and may be notified to the radio communication node 100 A by the MAC-CE.

(3.2.2.3) Example 1-3

In this operation example, the number of guard symbols may be notified to the radio communication node 100 A while using the enhanced MAC-CE that is an extension of the MAC-CE of Release 16. In the present operation example, the guard symbol numbers may be different from each other in a plurality of timing modes. In this operation example, the radio communication node 100 A can calculate the number of guard symbols in each timing mode by using the notification of the enhanced MAC-CE. In the calculation of the number of guard symbols in this operation example, the value of TA (Timing Advance) in each timing mode can be used, for example.

(3.2.2.3.1) Example 1-3-1

The enhanced MAC-CE of this example may include an index corresponding to a particular switching scenario, an indication of one or more timing modes, and one or more fields indicating the number of guard symbols corresponding to the one or more timing modes.

Figure 6:
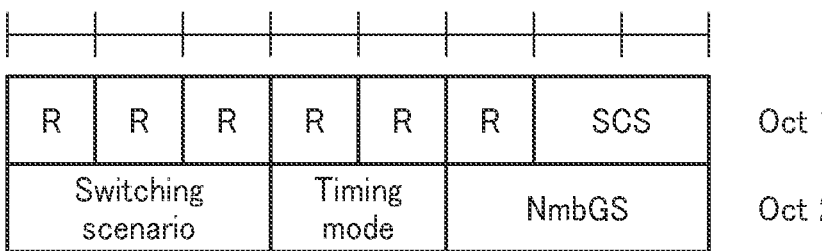
FIG. 6 is a diagram showing an example of the configuration of the Enhanced MAC-CE in Operation Example 1-3-1.
Figure 7:
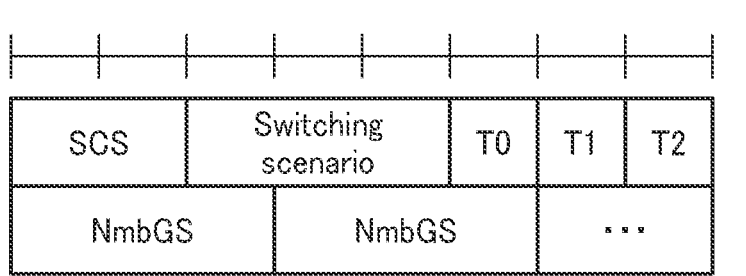
FIG. 7 is a diagram showing an example of the configuration of the Enhanced MAC-CE in Operation Example 1-3-1.

Specifically, the enhanced MAC-CE of this operation example may have a configuration as shown in FIG. 6 or FIG. 7, for example.

The Enhanced MAC-CE shown in FIG. 6 shows an example of a configuration when an instruction of one timing mode is included. In FIG. 6, "R" represents reserved bits, "SCS" represents a subcarrier spacing, "Switching scenario" represents one index corresponding to a specific switching scenario, "Timing mode" represents an indication of one timing mode, and "NmbGS" represents one field indicating the number of guard symbols corresponding to the one timing mode.

The "switching scenario" shown in FIG. 6 is not limited to one expressed by three bits, but may be expressed by other number of bits. Further, the "Timing mode" in FIG. 6 is not limited to one expressed by two bits, but may be expressed by other number of bits.

The Enhanced MAC-CE shown in FIG. 7 shows an example of a configuration in which one or more timing mode instructions are included. In FIG. 7, "SCS" represents a subcarrier spacing, "Switching scenario" represents one index corresponding to a specific switching scenario, "TO" represents the presence or absence of a timing mode instruction of Case #1, "T1" represents the presence or absence of a timing mode instruction of Case #6, "T2" represents the presence or absence of a timing mode instruction of Case

7a, and "NmbGS" represents one or more fields indicating the number of guard symbols corresponding to one or more timing modes.

According to the Enhanced MAC-CE shown in FIG. 7, for example, when a switching scenario corresponding to switching from RX of DL to RX of UL is configured and "TO" is configured to "1", the number of guard symbols used to adjust the reception timing of RX of UL corresponding to the timing mode of Case #1 is represented by "NmbGS" for one field.

According to the Enhanced MAC-CE shown in FIG. 7, for example, when a switching scenario corresponding to switching from RX of DL to RX of UL is configured and "T1" is configured to "1", the number of guard symbols used to adjust the transmission timing of TX of UL corresponding to the timing mode of Case #6 is represented by "NmbGS" for one field.

In the Enhanced MAC-CE shown in FIG. 7, "NmbGS" corresponding to the timing mode configured to "0" among "T0", "T1" and "T2" is not included.

The "switching scenario" shown in FIG. 7 is not limited to one expressed by three bits, but may be expressed by other number of bits. Further, the "Timing mode" in FIG. 7 is not limited to one expressed by three bits, but may be expressed by other number of bits.

According to this operation example, for example, the number of guard symbols according to the timing mode in each of the p switching scenarios can be notified by a bitmap including p (p≥2) Enhanced MAC-CEs having the configuration shown in FIG. 6 or FIG. 7.

Figure 8:
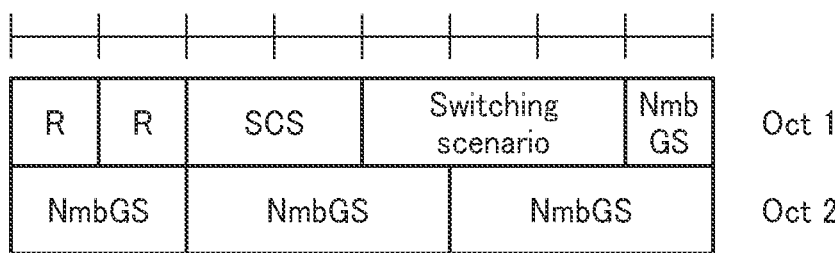
FIG. 8 is a diagram showing an example of the configuration of the Enhanced MAC-CE in Operation Example 1-3-1.

According to this operation example, in the case where "NmbGS" is included for all the timing modes supported by the radio communication node 100 B in the enhanced MAC-CE, the indication of the timing mode by "Timing mode" can be omitted, for example, as shown in FIG. 8.

The Enhanced MAC-CE shown in FIG. 8 includes the same "R", "SCS", and "Switching scenario" as in FIG. 6. In addition, the Enhanced MAC-CE shown in FIG. 8 includes three "NmbGS" fields corresponding to the three timing modes supported by the radio communication node 100 B.

That is, if all the timing modes supported by the radio communication node 100 B are n, configuring n "NmbGS" fields in the enhanced MAC-CE allows the indication of the timing mode by "Timing mode" to be omitted.

(3.2.2.3.2) Example 1-3-2

The enhanced MAC-CE of this example may include an index corresponding to a particular timing mode, an indication of one or more switching scenarios, and one or more fields indicating the number of guard symbols corresponding to the one or more switching scenarios.

Figure 9:
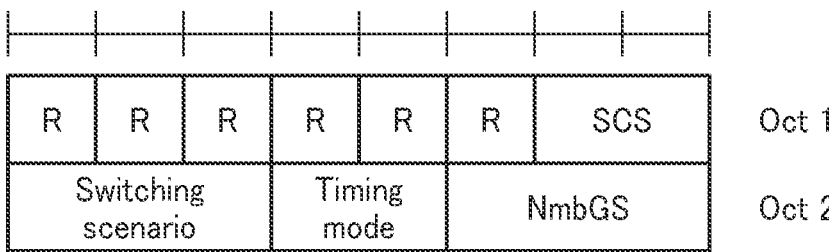
FIG. 9 is a diagram showing an example of the configuration of the Enhanced MAC-CE in Operation Example 1-3-2.
Figures 10, 11:
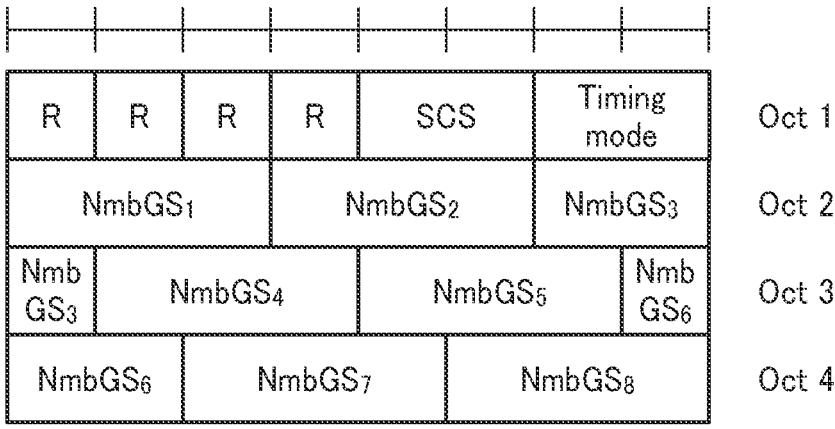
FIG. 10 is a diagram showing an example of the configuration of the Enhanced MAC-CE in operation example 1-3-2.
FIG. 11 is a diagram showing an example of the configuration of the Enhanced MAC-CE in operation example 1-3-2.

Specifically, the enhanced MAC-CE of this operation example may have a configuration as shown in FIG. 9 or FIG. 10, for example.

The Enhanced MAC-CE shown in FIG. 9 shows an example of a configuration that includes instructions for one switching scenario. In FIG. 9, "R" represents reserved bits, "SCS" represents a subcarrier spacing, "Timing mode" represents one index corresponding to a specific timing mode, "Switching scenario" represents an indication of one switching scenario, and "NmbGS" represents one field indicating the number of guard symbols corresponding to the one switching scenario.

The "switching scenario" shown in FIG. 9 is not limited to one expressed by three bits, but may be expressed by other number of bits. Further, the "Timing mode" in FIG. 8 is not limited to one expressed by two bits, but may be expressed by other number of bits.

The Enhanced MAC-CE shown in FIG. 10 shows an example of a configuration that includes instructions for one or more switching scenarios. In FIG. 10, "SCS" represents a subcarrier spacing, "Timing mode" represents one index corresponding to a specific timing mode, "S0" to "S7" represent the presence or absence of instructions for each of eight switching scenarios, and "NmbGS" represents one or more fields indicating the number of guard symbols corresponding to one or more switching scenarios.

According to the enhanced MAC-CE shown in FIG. 10, for example, when "S0" is configured to "1", the number of guard symbols used in switching from RX of DL to TX of DL is represented by "NmbGS" for one field.

According to the Enhanced MAC-CE shown in FIG. 10, for example, when "S1" is configured to "1", the number of guard symbols used in switching from RX of DL to TX of UL is represented by "NmbGS" for one field.

In the enhanced MAC-CE shown in FIG. 10, "NmbGS" corresponding to the timing mode configured to "0" among "S0" to "S7" is not included.

The "switching scenario" in FIG. 10 is not limited to that expressed by 8 bits, but may be expressed by other number of bits. The "Timing mode" in FIG. 10 is not limited to a mode expressed by 2 bits, but may be a mode expressed by other number of bits.

According to this operation example, the number of guard symbols according to the switching scenario in each of the q timing modes can be notified by a bitmap including q ($q \geq 2$) Enhanced MAC-CEs having the configuration shown in FIG. 9 or FIG. 10, for example.

According to this operation example, in the case where "NmbGS" for all switching scenarios supported by the radio communication node 100 B is included in the enhanced MAC-CE, the instruction of the switching scenario by "Switching scenario" can be omitted, for example, as shown in FIG. 11.

The Enhanced MAC-CE shown in FIG. 11 includes the same "R", "SCS", and "Switching scenario" as in FIG. 9. The Enhanced MAC-CE shown in FIG. 10 also includes eight "NmbGS" fields for the eight switching scenarios supported by the radio communication node 100 B.

That is, if all the switching scenarios supported by the radio communication node 100 B are m, the "Switching scenario" instruction can be omitted by configuring m "NmbGS" fields in the enhanced MAC-CE.

(3.2.2.3.3) Example 1-3-3

The Enhanced MAC-CE in this example operation may include the number of guard symbols for all switching scenarios corresponding to all timing modes supported by the radio communication nodes 100 A, 100 B, and 100 C.

Figure 12:
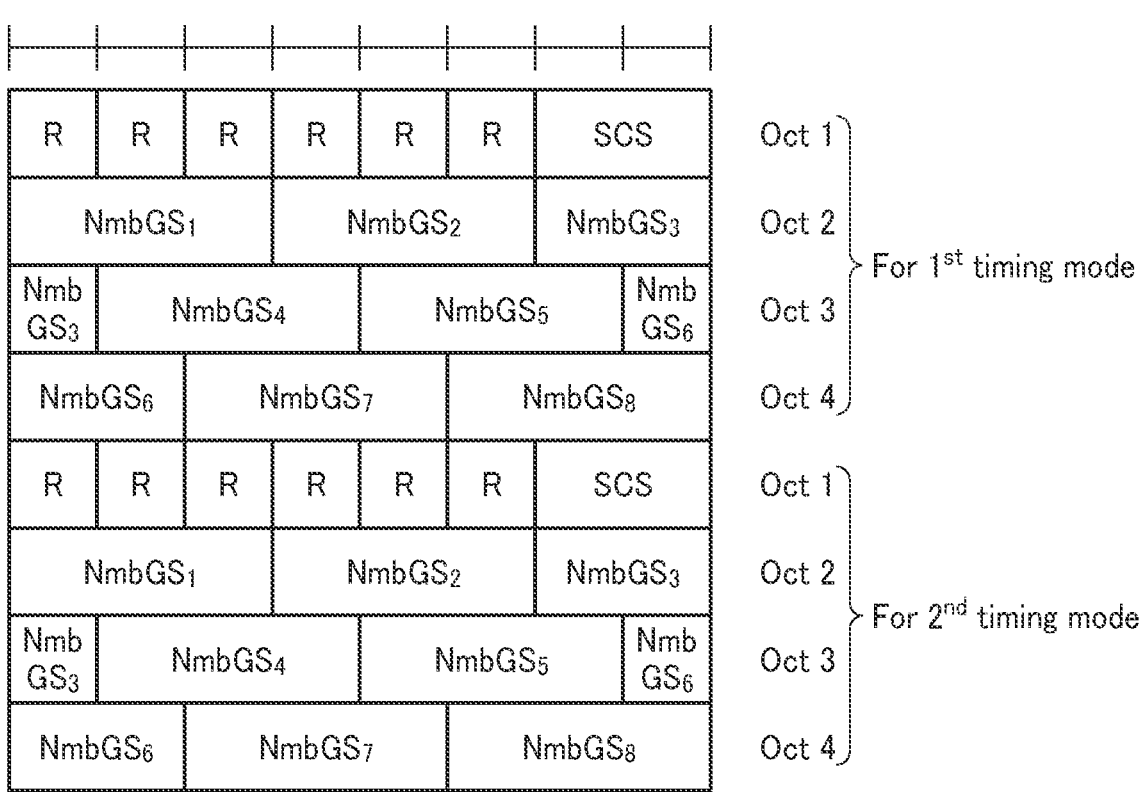
FIG. 12 is a diagram showing an example of the configuration of the Enhanced MAC-CE in operation example 1-3-3.

Specifically, as shown in FIG. 12, eight "NmbGS" fields corresponding to each of eight switching scenarios are provided for each timing mode in the Enhanced MAC-CE of this operation example.

The Enhanced MAC-CE shown in FIG. 12 shows a configuration example in which the number of guard symbols corresponding to each of the eight switching scenarios in the first timing mode and the number of guard symbols corresponding to each of the eight switching scenarios in the second timing mode are notified. In FIG. 12, "R" represents reserved bits and "SCS" represents a subcarrier spacing.

(3.2.3) Example 2

In this operation example, the number of guard symbols at the time of switching between MT and DU may be configured on the assumption that different timing modes (For example, Case #1, Case #6 and Case #7) are configured in Link_parent and Link_child.

(3.2.3.1) Example 2-1

In this operation example, the number of guard symbols may be notified to the child node while using the Enhanced MAC-CE having a configuration as exemplified in the operation example 1-3. In this operation example, the number of guard symbols of the Link_child may be configured based on the number of guard symbols of the Link_parent configured according to the operation example 1-2.

Specifically, the number of guard symbols in each timing mode (Case #1, Case #6a, and Case #7) used to adjust the reception timing of the RX of UL may be configured based on the number of guard symbols in one timing mode (Of Case #1, Case #6, and Case #7a) used to adjust the transmission timing of the TX of UL.

(3.2.3.1.1) Example 2-1-1

The number of guard symbols in each timing mode used to adjust the reception timing of the RX of UL may be configured based on the number of guard symbols of the TX of UL in Case #1 calculated by the same method as in Operation Example 1-2-1, and may be notified to the child node by the MAC-CE having a configuration as exemplified in Operation Example 1-3.

According to this operation example, the number of guard symbols of the TX of UL in Case #6 and Case #7a may be calculated by the same method as in the operation example 1-2-1.

(3.2.3.1.2) Example 2-1-2

The number of guard symbols in each timing mode used to adjust the reception timing of the RX of UL may be configured based on the number of guard symbols of the TX of UL in Case #6 calculated by the same method as in Operation Example 1-2-2, and may be notified to the child node by the MAC-CE having a configuration as exemplified in Operation Example 1-3.

According to this operation example, the number of guard symbols of the TX of UL in Case #1 and Case #7a may be calculated by the same method as in Operation Example 1-2-2.

(3.2.3.1.3) Example 2-1-3

The number of guard symbols in each timing mode used to adjust the reception timing of the RX of UL may be configured based on the number of guard symbols of the TX of UL in Case #7a calculated by the same method as in Operation Example 1-2-3, and may be notified to the child node by the MAC-CE having a configuration as exemplified in Operation Example 1-3.

According to this operation example, the number of guard symbols of the TX of UL in Case #1 and Case #6 may be calculated by the same method as in Operation Example 1-2-3.

(3.2.3.2) Example 2-2

In this operation example, the number of guard symbols may be notified to the child node while using the Enhanced MAC-CE having a configuration as exemplified in the operation example 1-3. In this operation example, the number of guard symbols of the Link_child may be configured according to the number of guard symbols of the Link_parent configured according to the operation example 1-3.

Specifically, according to the number of guard symbols in all timing modes (Case #1, Case #6 and Case #7a) used to adjust the transmission timing of the TX of UL, the number of guard symbols in each timing mode (Case #1, Case #6a, and Case #7) used to adjust the reception timing of the RX of UL may be configured. In the present operation example, the Enhanced MAC-CE having a configuration as exemplified in the operation example 1-3 may indicate a combination of the number of guard symbols in all timing modes (Case #1, Case #6 and Case #7a) used to adjust the transmission timing of the TX of UL and the number of guard symbols in all timing modes (Case #1, Case #6a, and Case #7) used to adjust the reception timing of the RX of UL.

(3.2.4) Example 3

In this operation example, the timing mode supported by the IAB node and/or the child node may be notified to the parent node.

Specifically, in this operation example, for example, the timing mode of the TX of UL supported by the IAB node may be notified to the parent node by the MAC-CE of Release 16 or the Enhanced MAC-CE described above. That is, in this operation example, the radio communication node 100 B may notify the radio communication node 100 A of a timing adjustment method (Case #1, Case #6 and Case #7a) available for dynamically adjusting the transmission timing of the TX of UL.

In this operation example, for example, the timing mode of the RX of UL supported in the IAB node may be notified to the parent node by the MAC-CE of Release 16 or the Enhanced MAC-CE described above. That is, in this operation example, the radio communication node 100 B may notify the radio communication node 100 A of a timing adjustment method (Case #1, Case #6a, and Case #7) available for dynamically adjusting the reception timing of the RX of UL.

In this operation example, for example, the timing mode of the TX of UL supported by the child node may be notified to the parent node by the MAC-CE of Release 16 or the Enhanced MAC-CE described above.

(3.2.5) Example 4

In this operation example, it is sufficient to use different numbers of guard symbols in a plurality of timing modes. In this operation example, the number of guard symbols may be configured according to the timing mode in the Link_parent and the timing mode in the Link_child.

Figure 13:
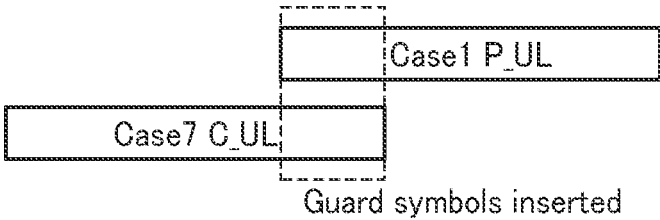
FIG. 13 is a diagram for explaining operation example 4.

Specifically, for example, in the case of transition from the operation relating to the RX of UL in the DU to the operation relating to the TX of UL in the MT as shown in FIG. 13, the number of guard symbols corresponding to the sum of the number of guard symbols of the TX of UL in Case #1 and the number of guard symbols of the RX of UL in Case #7 may be configured.

(4) Operational Effects

According to the embodiment described above, the following effects are obtained.

An IAB node (radio communication node 100 B) can configure a first symbol number used for dynamically adjusting transmission timing when performing transmission (TX of UL) in an upstream direction in a first radio link (Link_parent) connected to an upper node (radio communication node 100 A), and can notify the upper node of the first symbol number. Therefore, when the IAB node performs radio communication with the parent node, the IAB node can surely perform timing adjustment necessary for realizing simultaneous operation of the MT and the DU.

The IAB node (radio communication node 100 B) can configured the number of second symbols used for dynamically adjusting the reception timing in the uplink reception (RX of UL) in the second radio link (Link_child) connected to the lower node (child node), and can notify the lower node of the number of second symbols. Therefore, when the IAB node performs radio communication with the child node, the IAB node can surely perform timing adjustment necessary for realizing simultaneous operation of the MT and the DU.

In addition, the IAB node (radio communication node 100 B) can notify the upper node (radio communication node 100 A) of a timing adjustment method (Case #1, Case #6 and Case #7a) that can be used for dynamically adjusting the transmission timing when performing the uplink transmission (TX of UL) in the first radio link (Link_parent). Therefore, when the IAB node performs radio communication with the parent node, the IAB node can surely perform timing adjustment necessary for realizing simultaneous operation of the MT and the DU.

In addition, the IAB node (radio communication node 100 B) can notify the upper node (radio communication node 100 A) of a timing adjustment method (Case #1, Case #6a, and Case #7) that can be used for dynamically adjusting the reception timing when the uplink reception (RX of UL) in the second radio link (Link_child) is performed. Therefore, when the IAB node performs radio communication with the parent node, the IAB node can surely perform timing adjustment necessary for realizing simultaneous operation of the MT and the DU.

In addition, the IAB node (radio communication node 100 B) can configured the number of guard symbols different from each other in a plurality of timing adjustment methods that can be used when dynamically adjusting the transmission timing when performing uplink transmission (TX of UL) in the first radio link (Link_parent). Therefore, when the IAB node performs radio communication with the parent node, the IAB node can surely and flexibly perform timing adjustment necessary for realizing simultaneous operation of the MT and the DU.

(5) Other Embodiments

Although the embodiment has been described above, it is obvious to those skilled in the art that various modifications and improvements are possible without being limited to the description of the embodiment.

In the above-described embodiment, the number of symbols (the number of guard symbols) may be replaced with phrases such as a symbol period, a symbol time, a slot number, a slot period, a guard time, a protection time, and a prohibition time.

In the embodiments described above, the radio communication node 100 A (IAB donor) may be configured with a CU and one or more DUs. When CP (Control Plane) and UP (User Plane) are separated in the gNB-CU, the IAB donor may have CU-CP, a plurality of CU-UPs, and a plurality of DUs.

For example, in the above-described embodiment, the names of the parent node, the IAB node, and the child node are used, but the names may be different as long as a configuration of a radio communication node in which a radio backhaul between radio communication nodes such as gNB and radio access with a terminal are integrated is adopted. For example, it may be simply referred to as a first node, a second node, or the like, or it may be referred to as an upper node, a lower node, a relay node, an intermediate node, or the like.

The radio communication node may also be referred to simply as a communication device or communication node, or may be read as a radio base station.

Although the terms downlink (DL) and uplink (UL) have been used in the above embodiments, they may be referred to in other terms. For example, it may be replaced or associated with terms such as forward ring, reverse link, access link, backhaul, and the like. Alternatively, terms such as first link, second link, first direction, second direction, and the like may simply be used.

The block configuration diagrams (FIGS. 3 and 4) used in the description of the above-described embodiment show blocks in units of functions. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 14:
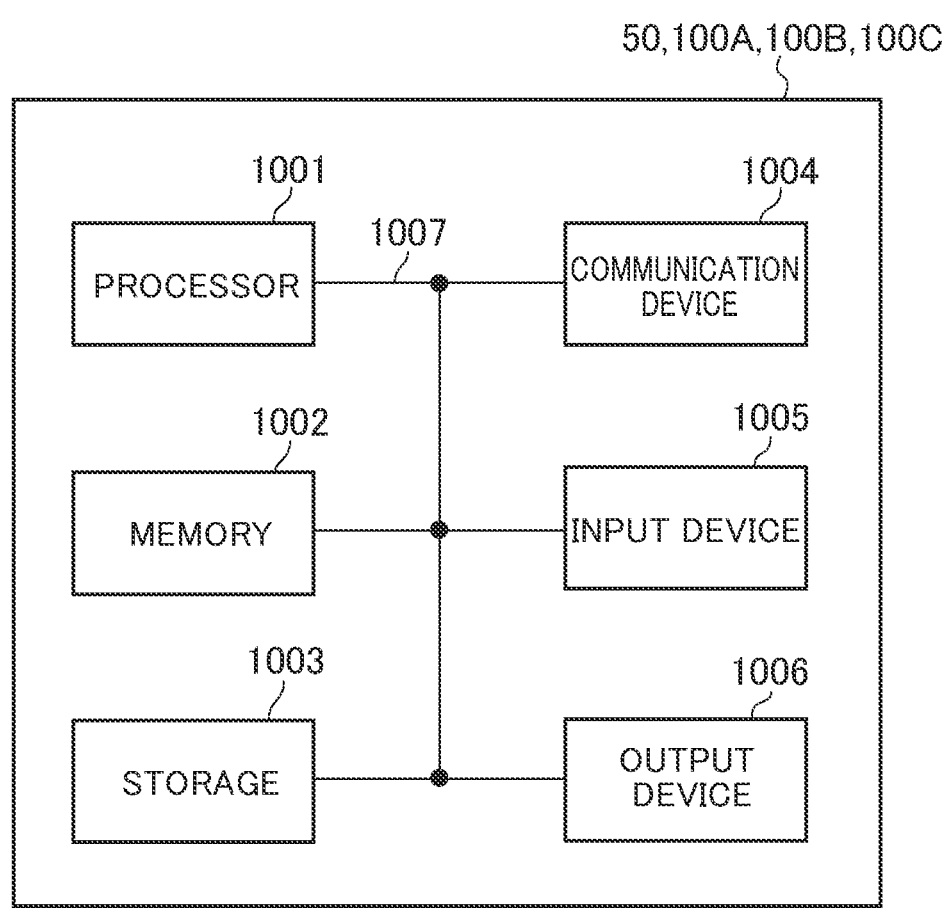
FIG. 14 is a diagram showing an example of the hardware configuration of CU 50, radio communication nodes 100 A to 100 C, and UE 200.

Further, the CU 50, the radio communication nodes 100 A to 100 C, and the UE 200 may function as a computer that performs processing of the radio communication method of the present disclosure. FIG. 14 is a diagram showing an example of a hardware configuration of the apparatus. As shown in FIG. 14, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIGS. 3 and 4) is realized by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, and the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and"down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station.

A radio frame may be composed of one or more frames in the time domain. Each frame or frames in the time domain may be referred to as a subframe. A subframe may be further configured by one or more slots in the time domain. The subframe may be a fixed time length (For example, 1 ms) independent of the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or"decision" may include regarding some action as "judgment" or"decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
50 CU
100 A, 100 B, 100 C radio communication nodes
110 radio transmission unit
120 radio reception unit
130 NW IF unit
140 IAB node connection unit
150 control unit
161 radio transmission unit
162 radio reception unit
170 upper node connection unit 180 lower node connection unit
190 control unit
200 UE
1001 processor
1002 memory
1003 storage
1004 communication device
1005 input device
1006 output device
1007 bus

The invention claimed is:

1. A radio communication node comprising:
a processor that configures a number of guard symbols respectively in a first adjustment method of adjusting transmission timing of a downlink between an upper node and the radio communication node, and a second adjustment method of adjusting transmission timing or reception timing of an uplink therebetween in addition to the transmission timing of the downlink; and
a transmitter that notifies the upper node or a lower node of the number of the guard symbols, which has been configured,
wherein the processor configures the number of the guard symbols in the first adjustment method and the number of guard symbols in the second adjustment method to be different number from each other.

2. The radio communication node according to claim 1, wherein the processor configures the number of the guard symbols in transition between a first function of connecting with the upper node, and a second function of connecting with the lower node.

3. The radio communication node according to claim 1, wherein the transmitter notifies the numbers of the guard symbols using a control element of Medium Access Control (MAC).

4. A radio communication method in a radio communication node, the method comprising:
configuring a number of guard symbols respectively in a first adjustment method of adjusting transmission timing of a downlink between an upper node and the radio communication node, and a second adjustment method of adjusting transmission timing or reception timing of an uplink therebetween in addition to the transmission timing of the downlink; and
notifying the upper node or a lower node of the number of the guard symbols, which has been configured,
wherein the number of the guard symbols in the first adjustment method and the number of guard symbols in the second adjustment method are configured to be different number from each other.

* * * * *